July 10, 1951   F. W. KESSLER   2,560,176
CHAMFER GAUGE
Filed May 13, 1949
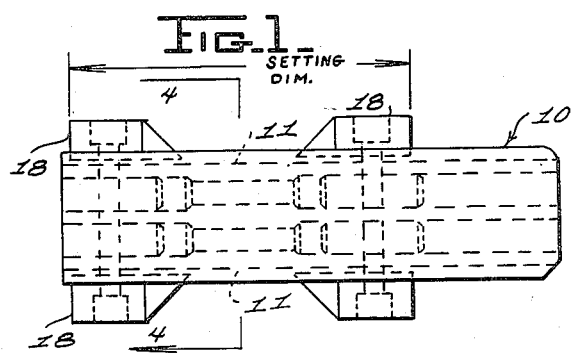
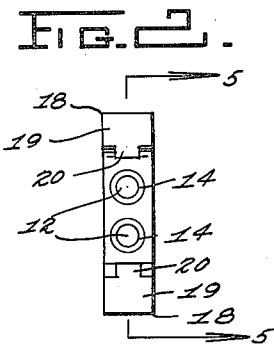
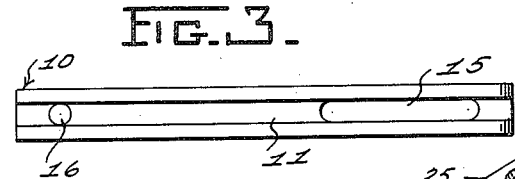
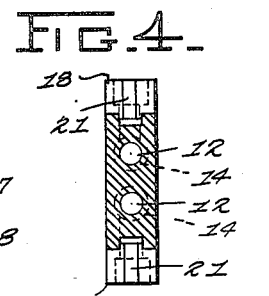
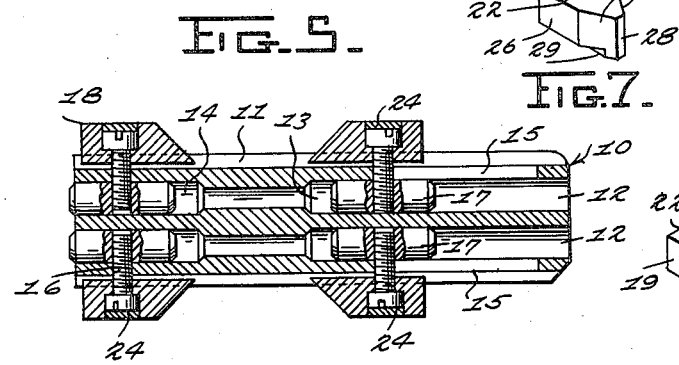
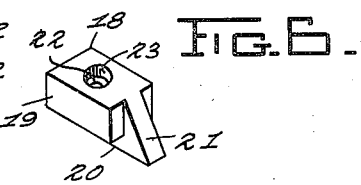
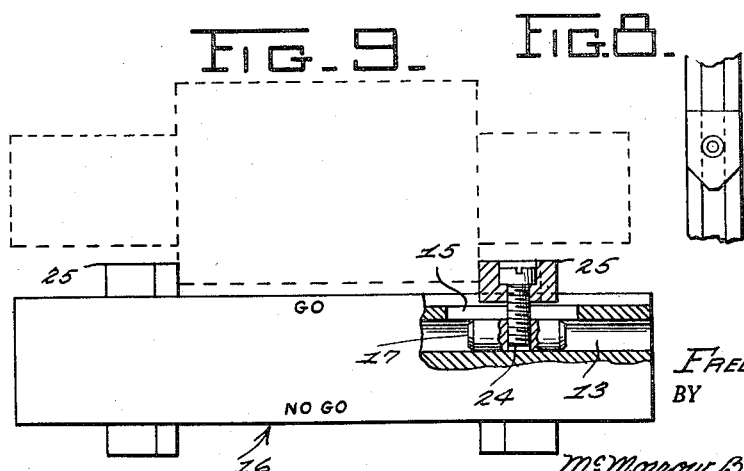
INVENTOR.
FREDERICK W. KESSLER
BY
McMorrow, Berman & Davidson
ATTORNEYS Patented July 10, 1951

2,560,176

UNITED STATES PATENT OFFICE 2,560,176

CHAMFER GAUGE

Frederick W. Kessler, Springfield, Mass.

Application May 13, 1949, Serial No. 93,086

2 Claims. (Cl. 33—168)

This invention relates to chamfer gauges, and more particularly to an adjustable gauge for measuring the distances between chamfered or beveled surfaces and other dimensions.

It is among the objects of the invention to provide an improved chamfer gauge which includes opposed gauge blocks adjustably movable toward and away from each other, and which may be firmly locked in adjusted position relative to each other, which utilizes different sets of gauge blocks of different shapes to measure the distance between various surfaces and can be used as a plug gauge and snap gauge, as well as a chamfer gauge, and which is of strong, durable and simple construction, extremely accurate, easy to adjust, and economical to manufacture.

Other objects and advantages will become apparent from a consideration of the following description and the appended claims in conjunction with the accompanying drawing, wherein:

Figure 1 is a side elevation of an adjustable chamfer gauge illustrative of the invention;

Figure 2 is an end elevation of the gauge illustrated in Figure 1;

Figure 3 is a top plan view of the body portion of the gauge illustrated in Figure 1, the gauge blocks being omitted;

Figure 4 is a transverse cross-section on the line 4—4 of Figure 1;

Figure 5 is a longitudinal cross-section on the line 5—5 of Figure 2;

Figure 6 is a perspective view of one of the gauge blocks;

Figure 7 is a perspective view of a somewhat modified form of gauge block adapting the gauge for use as a plug or snap gauge;

Figure 8 is a top plan view of a fragmentary portion of the gauge showing a gauge block of the form illustrated in Figure 7 in operative position thereon; and Figure 9 is a somewhat diagrammatic view showing the gauge with gauge blocks of the character illustrated in Figure 7 thereon in use as a "go" and "no go" snap gauge.

With continued reference to the drawing, the improved gauge includes a gauge body, generally indicated at 10, in the form of a flat, elongated block of suitable metal, such as tool steel, having substantially rectangular faces on all sides. This block has respective, longitudinally-extending grooves 11 in its opposite edges and has two longitudinally-extending bores 12 therethrough. The two grooves 11 are respectively located adjacent the opposite grooved edges of the block, and are substantially parallel to the edges of the block and to each other. Each bore 12 has, in one end, an elongated counterbore 13, and has in its opposite end a counterbore 14 somewhat shorter than the counterbore 13, the counterbores 13 and 14 opening to corresponding ends of the block. The grooves 11 are preferably of rectangular cross-sectional shape, and the block is provided with elongated slots 15 extending between the counterbores 13 and the adjacent portions of the respective grooves 11 and with screw-receiving holes 16 which extend between the counterbores 14 and the adjacent grooves 11.

Elongated, cylindrically-shaped nuts 17 are respectively disposed in the counterbores 13 and 14 of the bores 12, and each of these nuts has a screw-threaded opening extending diametrically through its mid-length location.

A set of four gauges 18 is adjustably mounted on the gauge body 10, the set of four being divided into two pairs of mutually-opposed blocks disposed at respectively opposite sides of the body.

Each of the chamfer-measuring gauge blocks, as particularly illustrated in Figures 1, 5 and 6, comprises a rectangular portion 19 having on one side an outwardly-extending tongue 20 disposed along the mid-width location of the rectangular portion and slidably received in the corresponding groove 11 of the body. The tongue 20 extends forwardly of the rectangular portion at the bottom of the latter and is then inclined upwardly toward the adjacent end of the rectangular portion at the top of the latter to provide an inclined surface 21 which is disposed at an angle to the corresponding edge of the gauge body corresponding to the inclination of the chamfered or beveled surfaces to be measured by the gauge. A screw hole 22 extends through the rectangular portion of the block 18 and through the tongue portion 20 thereof, and is provided, in its end adjacent the top of the block, with a countersink 23 to receive a screw head. Respective headed screws 24 extend through the screw holes in the rectangular portions of the gauge blocks and are threaded into corresponding nuts 17 in the bores 12. Two of these screws 24 extend through respective slots 15 in the gauge body, and the other two extend through respective screw-receiving holes 16 to firmly attach the gauge blocks to the gauge body. The chamfer gauge blocks 18 are mounted on the gauge body, so that the inclined end surfaces of the two blocks of each pair face each other, as clearly illustrated in Figures 1 and 5, and the gauge blocks attached to the body by the screws passing through the elongated slots 15 are adjustably movable lengthwise of the gauge body, while the other two blocks are substantially fixed relative to the gauge body.

All of the gauge blocks of a set have exactly the same dimensions within the limitations of mechanical accuracy, and the length of the rectangular portions of the gauge blocks is known and preferably reduced to some even dimension. The ends of the gauge blocks opposite the inclined faces 21 are perpendicular to the sides of the rectangular portions and are finished to provide accurate measuring surfaces. Each of the adjustable gauge blocks 18 can be adjusted relative to its opposed, relatively fixed gauge block by loosening the corresponding screw 24 and positioning the adjustable gauge block, so that the distance between the remote ends of the two gauge blocks of the pair is at a predetermined, measured distance which is equal to the desired distance between the points or heels of the inclined surface portions plus a constant dimension which is twice the length of the rectangular portion of each gauge block. The distance between the remote ends of the two gauge blocks of a pair can be measured by a suitable measuring instrument, such as a micrometer or scale. After the adjustable gauge block has been brought to the proper position, the corresponding screw 24 is tightened to lock such adjustable gauge block rigidly in adjusted position. After the gauge blocks have been adjusted, and the corresponding screws tightened, the countersinks 23, at the outer ends of the screw heads, are preferably filled with a suitable sealing material, such as sealing wax, to prevent accidental loosening of the screws.

While the chamfer gauge blocks are effective to measure external chamfer when positioned so that their inclined surfaces face each other, these blocks may be reversed in position, so that their inclined surfaces are at their outer sides in order to measure internal chamfer.

When it is desired to use the gauge as a snap or plug gauge, rather than as a chamfer gauge, the chamfer gauge blocks 18 are removed from the gauge body 10 and the snap and plug gauge blocks 25, particularly illustrated in Figures 7 and 8, are substituted for the gauge blocks 18.

The gauge block 25 comprises a rectangular portion 26 oppositely beveled at one end, as indicated at 27, to provide a narrow contact surface 28 at such one end of the block, which contact surface extends for the entire thickness of the block, and is perpendicular to the top and bottom faces of the rectangular portion 26. A tongue 29 projects outwardly from the bottom face of the block at the mid-width location of the latter and is slidably received in the corresponding groove 11 of the gauge body 10. When the four blocks 25 of a set of such blocks are mounted on the gauge body 10 with the narrow contact faces 28 facing each other, as illustrated in Figure 9, and the two gauge blocks of each pair are properly adjusted, the gauge may be used as a snap gauge, as indicated in Figure 9. Preferably, one pair of gauge blocks 25 is positioned to provide the "go" side of the snap gauge, and the other pair of gauge blocks 25 is positioned slightly closer to each other to provide the "no go" side of the gauge. By using both sides of the gauge, it can be quickly determined whether the measured dimension of the work piece is within the allowable tolerance.

When the narrow contact surfaces 28 of the gauge blocks 25 are faced outwardly away from each other, the gauge may be used as a plug gauge, as indicated in Figure 8, to measure internal dimensions of hollow bodies, and for similar purposes.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An adjustable gauge comprising an elongated rectangular body having a straight side edge and a bore extending longitudinally therethrough substantially parallel to said straight side edge, said body also having in said straight side edge a groove extending longitudinally of said body and substantially parallel to said bore and an elongated slot between said groove and said bore near one end of said body and a screw hole between said groove and said bore near the other end of said body, two elongated nuts disposed in said bore one underlying said slot and the other underlying said screw hole, two gauge blocks disposed on said straight side edge of said body and each having a screw hole therethrough and a tongue slidably received in said groove, the tongues holding the blocks against rotational movements relative to said body while providing freedom of sliding movement of one of said blocks longitudinally of said body, a screw extending through one of said gauge blocks and the screw hole in said body and threaded into the corresponding nut to fix said one gauge block in position near the adjacent end of said body, and a screw extending through the other gauge block and said slot and threaded into the corresponding nut to hold said other gauge block in selected positions of adjustment longitudinally of said body, the straight side of said rectangular body and the mutually opposed end surfaces of said gauge blocks constituting cooperating working surfaces for measuring chamfer on the end of a cylindrical work piece.

2. A gauge block comprising a rectangular portion having a screw hole extending therethrough and having on one side an outwardly extending tongue disposed along the mid-width location of said one side of said rectangular portion and extending beyond one end of the latter, said tongue being extended across said one end of said rectangular portion from said one side toward the side of said rectangular portion opposite said one side and having the outer edge of its extended portion inclined relative to said sides.

FREDERICK W. KESSLER.

REFERENCES CITED

The following references are of record in the file of this patent:

UNITED STATES PATENTS

| Number | Name | Date |
|---|---|---|
| 539,492 | Stone | May 21, 1895 |
| 1,289,089 | Begle | Dec. 31, 1918 |
| 1,436,260 | Jackson | Nov. 21, 1922 |
| 1,499,731 | Hanson | July 1, 1924 |
| 2,037,858 | Holls | Apr. 21, 1936 |